(12) United States Patent
Oh et al.

(10) Patent No.: US 11,661,897 B2
(45) Date of Patent: May 30, 2023

(54) ACTIVE PURGE SYSTEM AND PURGING METHOD ACCORDING TO OPERATING STATE OF HYBRID VEHICLE

(71) Applicants: Hyundai Motor Company, Seoul (KR); Kia Corporation, Seoul (KR)

(72) Inventors: Young-Kyu Oh, Gyeonggi-do (KR); Keum-Jin Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/400,460

(22) Filed: Aug. 12, 2021

(65) Prior Publication Data

US 2022/0252016 A1 Aug. 11, 2022

(30) Foreign Application Priority Data

Feb. 9, 2021 (KR) ........................ 10-2021-0018460

(51) Int. Cl.
| | |
|---|---|
| F02M 35/10 | (2006.01) |
| F02M 25/08 | (2006.01) |
| B60K 6/26 | (2007.10) |
| F02D 41/02 | (2006.01) |
| F02D 41/00 | (2006.01) |
| B60K 6/24 | (2007.10) |
| B60K 6/28 | (2007.10) |
| B60K 6/32 | (2007.10) |
| B60K 6/36 | (2007.10) |

(52) U.S. Cl.
CPC .............. *F02D 41/003* (2013.01); *B60K 6/24* (2013.01); *B60K 6/26* (2013.01); *B60K 6/28* (2013.01); *B60K 6/32* (2013.01); *B60K 6/36* (2013.01); *F02D 41/0215* (2013.01); *F02M 25/0836* (2013.01); *F02M 35/10222* (2013.01); *B60K 2006/268* (2013.01); *F02D 2200/501* (2013.01)

(58) Field of Classification Search
CPC .............. F02D 41/003; F02D 41/0215; F02D 25/0836; F02D 35/10222; F02D 2200/501; B60K 6/26; B60K 6/28; B60K 6/32; B60K 6/36; B60K 2006/268
USPC .......................................................... 701/22
See application file for complete search history.

(56) References Cited

FOREIGN PATENT DOCUMENTS

| | | |
|---|---|---|
| DE | 102018220884 A1 * 6/2019 | ......... F02D 41/0007 |
| JP | 2019183687 A * 10/2019 | |

(Continued)

OTHER PUBLICATIONS

DE102018220884A1 (Young Kyu Oh) (Jun. 19, 2019) (Machine Translation) (Year: 2019).*

*Primary Examiner* — Mahmoud Gimie
(74) *Attorney, Agent, or Firm* — Fox Rothschild LLP

(57) ABSTRACT

An active purge system (APS) according to a driving state of a hybrid vehicle includes an active purge unit (APU) configured to pressurize a vaporized gas generated in a fuel tank of the hybrid vehicle and supply the pressurized vaporized gas to an intake pipe, and a control unit configured to control the APU, where the control unit gradually controls a processing amount of the vaporized gas according to the driving state of the hybrid vehicle. The processing amount of the vaporized gas is gradually controlled using the APS according to the driving state of the hybrid vehicle, particularly, a number of places at which slip occurs in a power transmission system of the hybrid vehicle so that degradation of driving ability due to the occurrence of slip is reduced.

11 Claims, 15 Drawing Sheets

(56) References Cited

FOREIGN PATENT DOCUMENTS

| JP | 2020016225 | A | * | 1/2020 | ......... F02D 41/0002 |
| JP | 2020180565 | A | * | 11/2020 | |
| KR | 10-1262605 | B1 | | 5/2013 | |
| KR | 10-1550637 | B1 | | 9/2015 | |
| WO | WO-2020105246 | A1 | * | 5/2020 | ......... F02D 41/0045 |

* cited by examiner

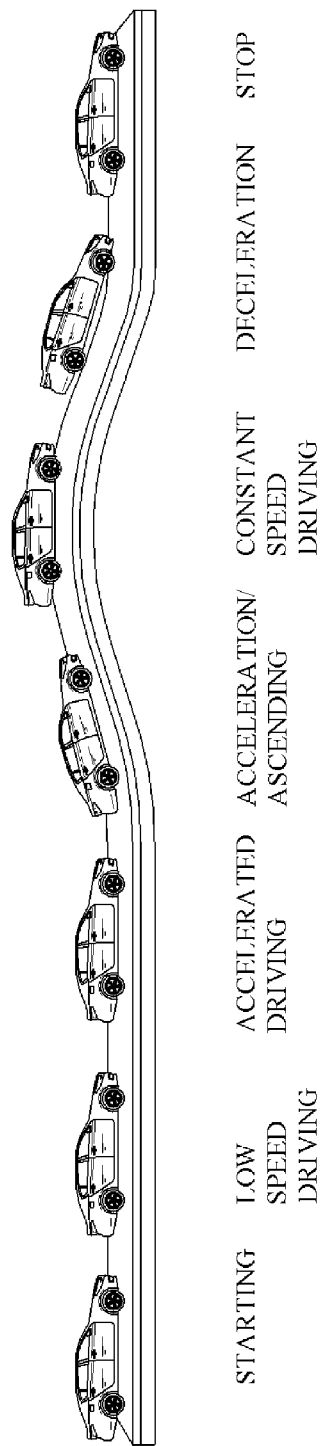

ACTIVE PURGE SYSTEM AND PURGING METHOD ACCORDING TO OPERATING STATE OF HYBRID VEHICLE

CROSS-REFERENCE TO RELATED APPLICATION

This application claims under 35 U.S.C. § 119(a) the benefit of Korean Patent Application No. 10-2021-0018460, filed on Feb. 9, 2021, the entire contents of which are incorporated herein by reference.

BACKGROUND

(a) Technical Field

The present disclosure relates to an active purge system (APS) of a hybrid vehicle and an active purging method thereof, more particularly, to the APS of the hybrid vehicle which actively controls processing of a vaporized gas according to a driving state of the hybrid vehicle, and the active purging method of the hybrid vehicle.

(b) Description of the Related Art

A hybrid vehicle generally refers to a vehicle which is driven by an engine that obtains driving force by combusting fuel, and a motor that obtains driving force from electric power.

As disclosed in Korean Patent Registration No. 10-1550637 (Sep. 7, 2015), main driving modes of the hybrid vehicle include an electric vehicle (EV) mode in which only a motor is driven, a hybrid EV (HEV) mode in which an engine and the motor are driven together, and a slip driving mode in which a torque of the engine is transmitted in a state in which a rotation speed of the engine is different from a rotation speed of the motor without completely locking up an engine clutch in the HEV mode.

For example, among various driving situations shown in FIG. 15, during starting of an engine and driving at a low speed, a vehicle drives in an EV mode in which only the motor is driven without driving the engine, and during acceleration driving and acceleration/ascending, the engine is automatically started and thus the vehicle drives in an HEV mode in which the engine and a motor are simultaneously driven. In addition, during constant speed driving, the vehicle is driven such that a driving mode is appropriately selected according to a state of charge (SOC) of a high voltage battery. Meanwhile, during the constant speed driving, when the SOC is less than a predetermined level, the high voltage battery is charged, and during deceleration, the engine is stopped and energy generated through a regenerative braking system is recovered to charge the high voltage battery.

Meanwhile, during switching of the driving mode, a speed of the engine is synchronized with a speed of the motor, and then the engine clutch is locked up. In this case, a difference in inertia force between the engine and a rotating body of the motor may occur, and thus an amount of impact may be increased during locking-up. In order to solve the above problem, slip control in which synchronization between the rotation speed of the engine and the rotation speed of the motor is performed, and a variance is kept constant (the slip driving mode).

However, when the slip control is performed or unintended slip occurs in a power transmission system, there is a problem in that not only burning occurs in the engine clutch, but also torque is not sufficiently generated so that vibration occurs to degrade driving ability.

Meanwhile, in a fuel tank in which fuel supplied to the engine is stored, a vaporized gas is generated due to evaporation of the fuel according to variations in temperature and pressure in the fuel tank. When the vaporized gas is continuously generated, there is a possibility in that an internal pressure of the fuel tank becomes higher than necessary. When the vaporized gas leaks from the fuel tank, the atmosphere may be polluted.

Thus, as disclosed in Korean Patent Registration No. 10-1262605 (May 2, 2013), a purge system for removing a vaporized gas is installed in a vehicle. The purge system generally includes a canister for collecting a vaporized gas and a purge control valve connecting a canister to an intake pipe. When a supercharger is not provided in the engine and the canister and the intake pipe are communicated with each other due to operation of a purge control valve, the vaporized gas collected in the canister is introduced into the intake pipe due to an intake pressure acting on the intake pipe.

Meanwhile, as described above, when intended or unintended slip occurs in a process of switching a power transmission system according to a driving state of a hybrid vehicle, and when a vaporized gas is purged in the driving state, there is a problem in that driving ability is further degraded in the process of introducing a purge fuel component in the vaporized gas. However, existing purge control systems and purge control methods do not adequately address the above problem.

SUMMARY

An embodiment of the present disclosure is directed to an active purge system (APS) and an active purging method of a hybrid vehicle, which are capable of preventing degradation of driving ability even when slip occurs in a power transmission system according to a driving state of the hybrid vehicle.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

When a supercharger is provided in the hybrid vehicle, an internal pressure of an intake pipe may be greater than or equal to the atmospheric pressure due to an operation of the supercharger. In this case, with a conventional purge system, there is a probability in that a vaporized gas is not moved from a canister to the intake pipe, and intake air is moved from the intake pipe to the canister.

In order to solve the above problem, instead of the existing purging using a negative intake pressure, an APS according to the present disclosure operates a separate purge pump to forcibly perform purging of a vaporized gas.

According to the APS of the present disclosure, the number of revolutions of the purge pump and an opening degree of a purge valve are appropriately controlled so that it is possible to gradationally and actively control a purging amount. Therefore, when the purging amount is actively controlled according to a driving state of the hybrid vehicle using the APS, it is possible to effectively suppress degradation in driving ability due to occurrence of slip.

In particular, in accordance with an embodiment of the present disclosure, there is provided an APS according to a driving state of a hybrid vehicle, which includes an active purge unit (APU) configured to pressurize a vaporized gas generated in a fuel tank of the hybrid vehicle and supply the pressurized vaporized gas to an intake pipe, and a control unit configured to control the APU, wherein the control unit gradually controls a processing amount of the vaporized gas according to the driving state of the hybrid vehicle.

Preferably, the APU may include a purge line which connects a canister configured to adsorb the vaporized gas to the intake pipe, a purge pump mounted on the purge line, and a purge valve mounted on the purge line and located between the purge pump and the intake pipe, and the control unit may adjust a revolution per minute (RPM) of the purge pump and an opening degree of the purge valve in a plurality of stages so as to allow the vaporized gas flowing from the purge line to the intake pipe to be maintained at a target purge flow rate.

Preferably, the control unit may adjust the RPM of the purge pump and the opening degree of the purge valve in the plurality of stages according to a number of places at which slip occurs in a power transmission path of the hybrid vehicle.

Preferably, the control unit may generate a control duty for controlling the RPM of the purge pump and the opening degree of the purge valve in a first stage when the slip occurs at one place on the power transmission path of the hybrid vehicle, generate a control duty for controlling the RPM of the purge pump and the opening degree of the purge valve in a second stage in which a duty amount is lower than a duty amount in the first stage when the slip occurs at two places on the power transmission path of the hybrid vehicle, and generate a control duty for controlling the RPM of the purge pump and the opening degree of the purge valve in a third stage in which a duty amount is lower than the duty amount in the second stage when the slip occurs at three places on the power transmission path of the hybrid vehicle.

Preferably, the control unit may adjust the RPM of the purge pump and the opening degree of the purge valve according to a vehicle speed and an engine condition when it is determined that the slip does not occur in the power transmission path of the hybrid vehicle.

Preferably, the slip may occur at one or more places between a hybrid start and generator (HSG) and an engine, between the engine and a motor, and between the motor and a transmission.

Preferably, the control unit may differently correct and control a target RPM of the purge pump and a target opening degree of the purge valve according to charging or discharging of the hybrid vehicle.

In accordance with another embodiment of the present disclosure, there is provided an active purging method of a hybrid vehicle using an active purge unit (APU) provided with a canister configured to adsorb a vaporized gas, a purge line which connects the canister to an intake pipe, a purge pump mounted on the purge line, and a purge valve mounted on the purge line and located between the purge pump and the intake pipe, which includes determining, by a control unit, whether slip occurs in each power transmission path of the hybrid vehicle; and adjusting, by the control unit, a revolution per minute (RPM) of the purge pump and an opening degree of the purge valve in a plurality of stages according to a number of places at which slip occurs in the power transmission path of the hybrid vehicle.

Preferably, the adjusting of the opening degree of the purge valve in the plurality of stages may include controlling the RPM of the purge pump and the opening degree of the purge valve in a stage in which a purging amount is decreased among the plurality of stages as the number of places at which slip occurs in the power transmission path of the hybrid vehicle is increased.

Preferably, the active purging method may further include controlling the RPM of the purge pump and the opening degree of the purge valve in a first stage when the slip occurs at one place on the power transmission path of the hybrid vehicle, controlling the RPM of the purge pump and the opening degree of the purge valve in a second stage in which a duty amount is lower than a duty amount in the first stage when the slip occurs at two places on the power transmission path of the hybrid vehicle, and controlling the RPM of the purge pump and the opening degree of the purge valve in a third stage in which a duty amount is lower than a duty amount in the second stage when the slip occurs at third places on the power transmission path of the hybrid vehicle.

Preferably, the active purging method may further include determining whether a state of charge (SOC) of a high voltage battery is greater than or equal to a predetermined level; when the SOC of the high voltage battery is greater than or equal to the predetermined level, general control may be performed to adjust the RPM of the purge pump and the opening degree of the purge valve according to a vehicle speed and an engine conditions; and when the SOC of the high voltage battery is less than the predetermined level, the control for adjusting the RPM of the purge pump and the opening degree of the purge valve in the plurality of stages may be performed according to the number of places at which slip occurs in the power transmission path of the hybrid vehicle.

Preferably, when it is determined that the slip does not occur in the power transmission path of the hybrid vehicle, general control for adjusting the RPM of the purge pump and the opening degree of the purge valve according to a vehicle speed and an engine condition may be performed.

Preferably, the active purging method may further include determining a driving state of the hybrid vehicle and a charging/discharging state of the high voltage battery, differently correcting a target RPM of the purge pump and a target opening degree of the purge valve according to charging or discharging of the hybrid vehicle, and performing control on the basis of the corrected target RPM of the purge pump and the corrected target opening degree of the purge valve.

BRIEF DESCRIPTION OF THE DRAWINGS

FIG. 15 is a diagram illustrating various driving states of the hybrid vehicle.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an active purge system (APS) and an active purging method of a hybrid vehicle according to one embodiment of the present disclosure will be described with reference to the accompanying drawings.

Figure 1:
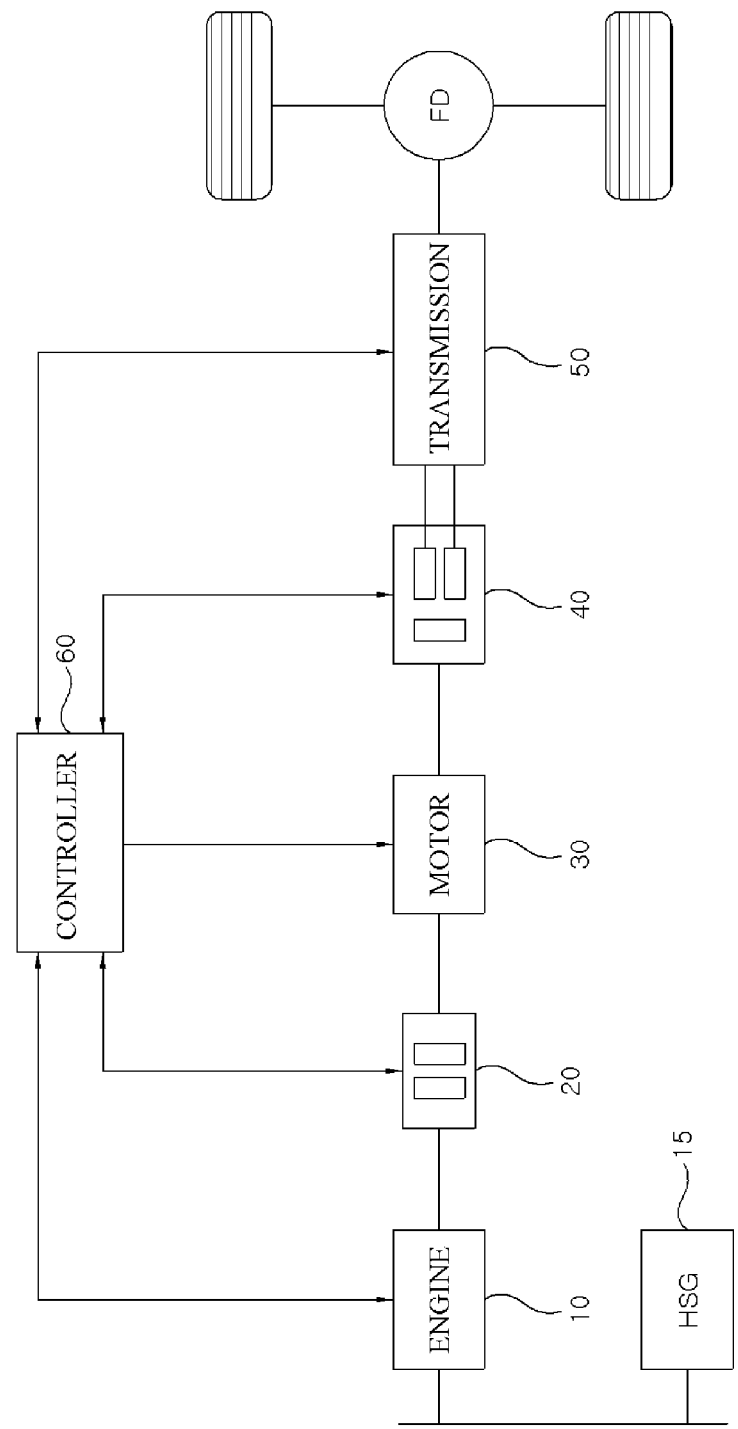
FIG. 1 is a diagram illustrating a power transmission system of a hybrid vehicle.

FIG. 1 illustrates a configuration of a power transmission system of a hybrid vehicle on which the APS of a hybrid vehicle according to one embodiment of the present disclosure is mounted.

Referring to FIG. 1, the power transmission system of the hybrid vehicle includes an engine 10, a hybrid start and generator (HSG) 15, an engine clutch 20, a motor 30, dual clutch transmission (DCT) 40, a transmission 50, and a controller 60.

As shown in FIG. 1, the engine 10 is connected to the motor 30 by the engine clutch 20 which is a first clutch, the DCT 40 which is a second clutch is connected to the engine 10 and a shaft of the motor 30, and the transmission 50 is connected to the DCT 40. In the illustrated example of FIG. 1, the motor 30 and the transmission 50 have been shown as being connected by the DCT 40 which is the second clutch, but the present disclosure is not limited thereto and may be applied to a case in which the motor 30 and the transmission 50 are connected by a different type of clutch.

In addition, the HSG 15 for igniting fuel of a cylinder provided in the engine 10 is connected to the engine 10. The HSG 15 is operated by a motor to start the engine 10, or when an extra output is generated in a state in which a starting ON of the hybrid vehicle is maintained, the HSG 15 serves as a generator to charge a battery. Typically, the HSG 15 has a structure which is connected to a crankshaft of the engine 10 through a belt and a pulley.

The engine clutch 20 is disposed between the engine 10 and the motor 30 and receives a control signal from the controller 60 to selectively connect the engine 10 to the motor 30 according to a driving mode of the hybrid vehicle.

In the DCT 40, a plurality of input gears are distributed and disposed on two input shafts, and a plurality of output gears engaged with the plurality of input gears are distributed and disposed on two output shafts. In addition, the DCT 40 includes a plurality of synchronizer mechanisms, and the plurality of synchronizer mechanisms are selectively operated to connect one among the plurality of output gears to one of the two output shafts. In addition, the DCT 40 includes two clutches. Each of the clutches is formed to transmit power of a power source (e.g., the engine 10 or the motor 30) to one of the two input shafts connected to the transmission 50. A dry or wet clutch may be used as the clutch.

Generally, during initial starting, the hybrid vehicle drives the motor 30 using power charged in the battery, and the DCT 40 is completely coupled due to a driving force generated from the motor 30 to transmit the power to a driving shaft.

In the transmission 50, the sum of an output torque of the engine 10 and an output torque of the motor 30, which are determined according to engagement and disengagement of the engine clutch 20, is supplied as an input torque, and an arbitrary gear shift stage is selected according to a vehicle speed and a driving condition so that the transmission 50 outputs the driving force to a driving wheel to maintain driving.

The controller 60 outputs a control signal to control a connection between the engine clutch 20 and the DCT 40. For example, a hybrid control unit (HCU) which is the highest level controller, an engine control unit (ECU) for controlling entire operations of an engine, a motor control unit (MCU) for controlling entire operations of a driving motor, and a transmission control unit (TCU) for controlling a transmission may be employed as the controller 60.

Figure 2:
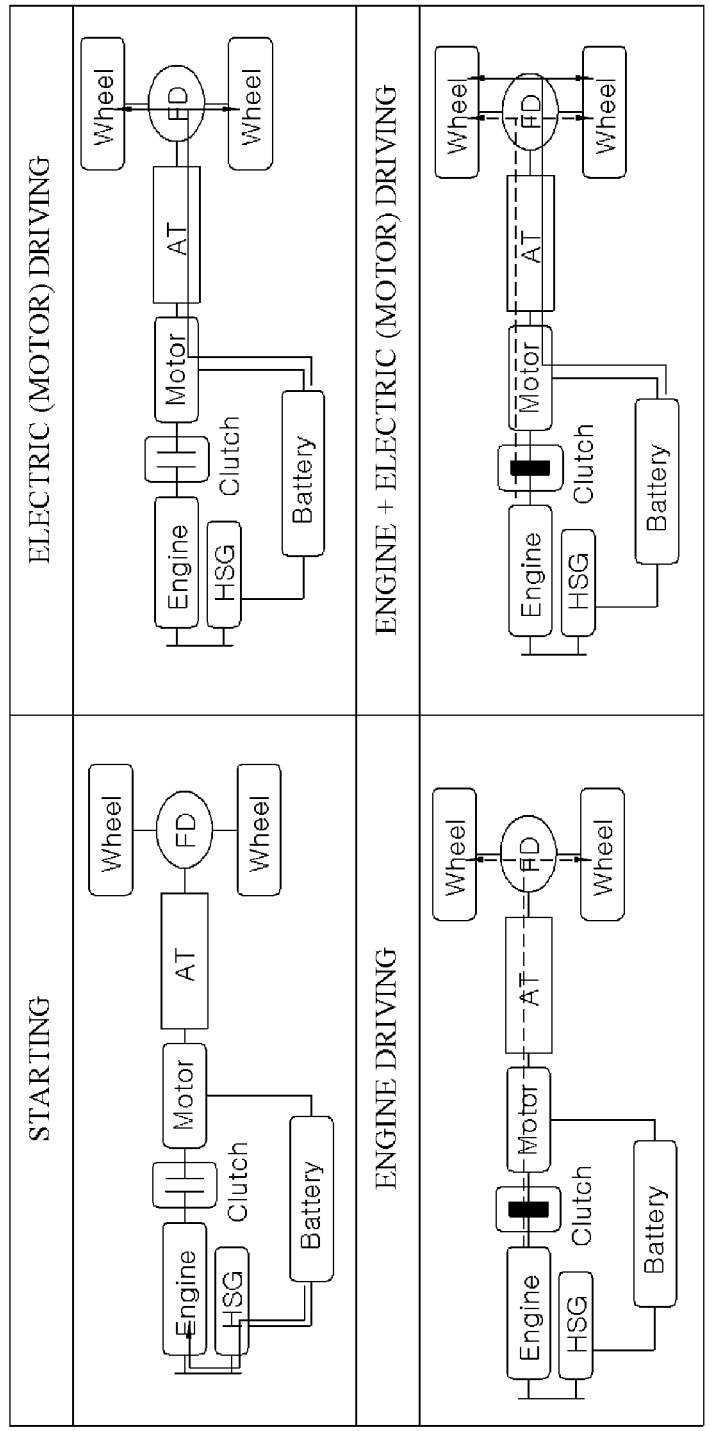
FIG. 2 is a diagram illustrating a power transmission structure for each driving state when a high voltage battery of the hybrid vehicle is discharged.

FIG. 2 illustrates a power transmission structure for each driving state when a high voltage battery of the hybrid vehicle is discharged.

Figure 14:
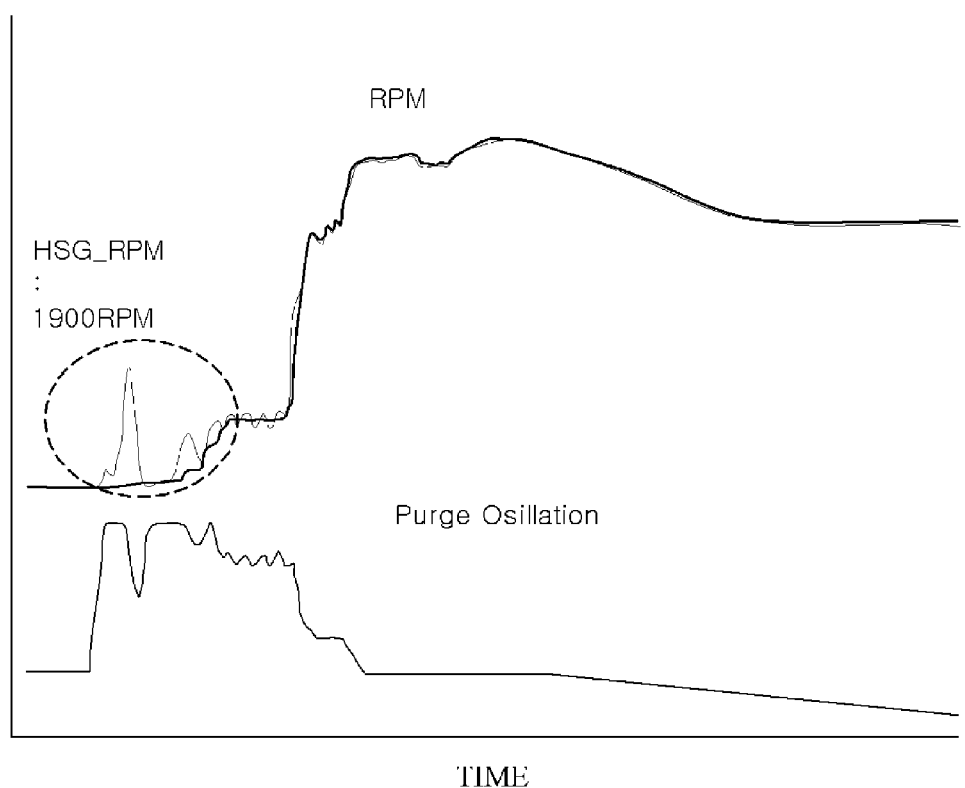
FIG. 14 is a graph showing a variation in RPM of each of the engine and the HSG and a variation in purging amount over time when slip occurs in the HSG during a starting of the engine.

During starting of the engine 10, power is transmitted to the HSG 15 through a belt and a pulley using electric power of the battery. During the above process, there is a probability in that slip occurs in the belt according to the operations of the engine 10 and the HSG 15, and when the slip occurs during the starting of the engine 10, there may occur slip in which a speed of the HSG 15 is not directly transmitted to the engine 10 so that the HSG 15 is rotated idle. When the slip occurs in the belt, the speed of the engine is decreased, and in order to correct the decrease in speed of the engine, the torque of the HSG 15 is further increased. However, as shown in FIG. 14, the increase in torque of the HSG 15 intensifies a slip phenomenon and thus a situation in which the speed of the HSG 15 is increased and the speed of the engine 10 is not increased or decreased occurs so that driving ability is degraded. In this case, when a vaporized gas is purged, the driving ability is further degraded due to an influence of a purge fuel component in the vaporized gas.

Meanwhile, during driving in the EV mode, in a state in which a connection of the engine clutch 20 between the engine 10 and the motor 30 is separated, the motor 30 and the transmission 50 are directly connected by the DCT 40 to transmit the driving force of the motor 30 to wheels. In addition, during driving in the HEV mode, the engine 10 and the motor 30 are directly connected by the engine clutch 20, and the motor 30 is directly connected to the transmission 50 by the DCT 40 so that the driving force of the engine 10 and the driving force of motor 30 are transmitted to the wheels. In addition, during an engine driving mode, the wheels are driven by the driving force of the engine 10 without a rotating force of the motor 30 due to the high voltage battery in the above state.

Figure 3:
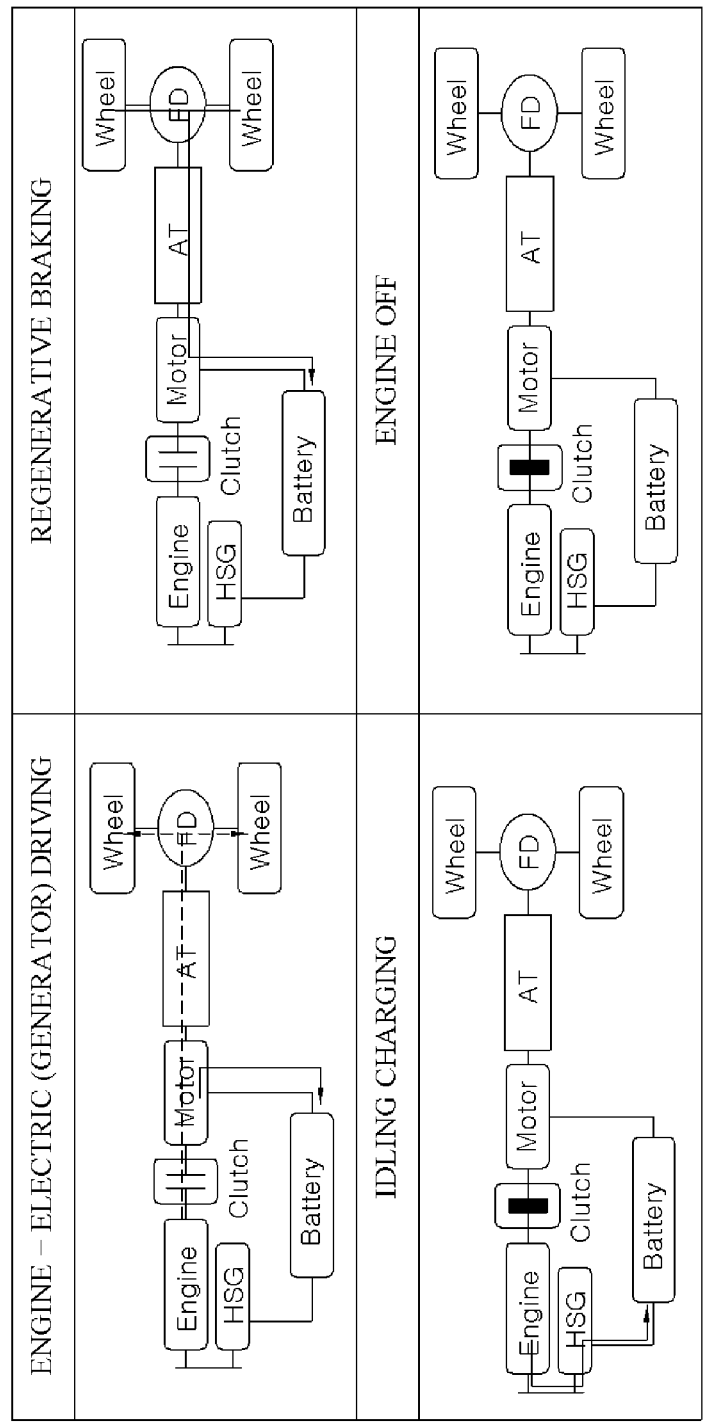
FIG. 3 is a diagram illustrating a power transmission structure for each driving state when the high voltage battery of the hybrid vehicle is charged.

FIG. 3 illustrates a power transmission structure for each driving state when the high voltage battery of the hybrid vehicle is charged.

During charging control using the driving force of the engine 10, the engine 10 and the motor 30 are directly connected by the engine clutch 20, and in a state in which the motor 30 and the transmission 50 are directly connected by the DCT 40, the wheels are driven due to the driving force of the engine 10 and the motor 30 is operated as a generator so that kinetic energy of the hybrid vehicle is converted into electrical energy thereof to charge the high voltage battery.

In addition, during regenerative braking in such a state, the connection between the engine 10 and the motor 30 by the engine clutch 20 is separated, and braking is performed by operating the motor 30 as a generator in addition to the existing hydraulic friction brake so that the high voltage battery is charged using electric power generated during the above process. In addition, during idle charging, in a state in which the connections between the engine 10 and the motor 30 and between the motor 30 and the transmission 50 are separated, the high voltage battery is charged through the HSG 15 using the rotating force of the engine 10.

As described above, according to the driving state and the charging/discharging state of the hybrid vehicle, the connection between the engine 10 and the motor 30 by the engine clutch 20 and the connection between the motor 30 and the transmission 50 by the DCT 40 are controlled. However, when two rotating bodies are connected by a clutch, a difference in inertia force between the two rotating bodies may occur and thus an amount of impact may be increased during a lock-up. In order to solve the above problem, the two rotating bodies are not completely locked up, and in a state in which rotation speeds of the two rotating bodies are different from each other, a torque is allowed to be transmitted so that slip control is performed to synchronize the rotation speeds of the two rotating bodies. However, as described above, since an amount of the torque transmitted during the slip control is decreased, degradation of driving ability, such as a vibration, occurs. In this case, when the vaporized gas is purged, the driving ability is further degraded due to an influence of a purge fuel component in the vaporized gas.

Thus, according to the present disclosure, when slip occurs, control for preventing degradation of the driving ability due to the purging of the vaporized gas is performed using an APS which will be described below.

Figure 4:
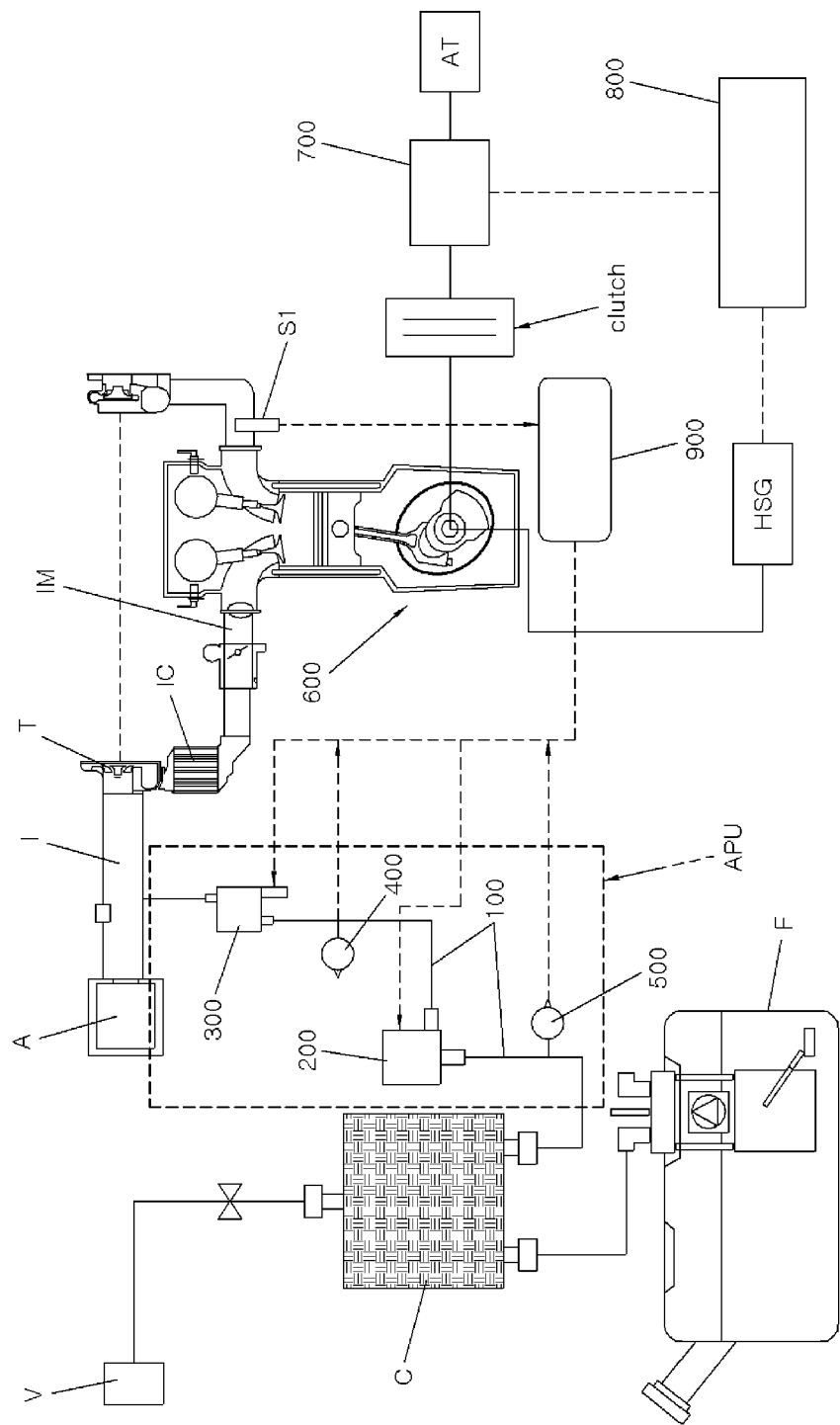
FIG. 4 is an exemplary diagram illustrating an active purge system (APS) of a hybrid vehicle according to one embodiment of the present disclosure.

FIG. 4 illustrates an APS of a hybrid vehicle according to one embodiment of the present disclosure.

As shown in FIG. 4, the APS of a hybrid vehicle according to one embodiment of the present disclosure includes an active purge unit (APU) for pressurizing a vaporized gas generated in a fuel tank F and supplying the pressurized vaporized gas to an intake pipe I, and a control unit 900 for controlling the APU.

The APU includes a purge line 100 which connects the intake pipe I to a canister C for adsorbing the vaporized gas generated from the fuel tank F, a purge pump 200 mounted on the purge line 100, a purge valve 300 mounted on the purge line 100 and located between the purge pump 200 and the intake pipe I, a first pressure sensor 40 mounted on the purge line 100 and located between the purge pump 200 and the purge valve 300, and a second pressure sensor 500 mounted on the purge line 100 and located between the canister C and the purge pump 200.

The control unit 900 receives signals from a battery 800, the first pressure sensor 400, and the second pressure sensor 500 and transmits operating signals to the purge pump 200 and the purge valve 300.

The canister C is connected to the atmosphere through a line. A vent valve V is provided on the line. The vent valve V selectively discharges only air to the outside of the canister C or introduces the air from the outside into the canister C. The control unit 900 receives a signal from a lambda sensor S1 for detecting an amount of oxygen in a combustion gas. The control unit 900 derives an air-fuel ratio of a mixed gas burned in a combustion chamber on the basis of the amount of oxygen detected by the lambda sensor S1. The control unit 900 transmits and receives signals to and from a fuel supply system which supplies fuel to the combustion chamber.

The intake pipe I is located between an air cleaner A and a turbocharger T. An intercooler IC is provided between the turbocharger T and an intake manifold IM.

The purge pump 200, the purge valve 300, the first pressure sensor 400, the second pressure sensor 500, and a flow meter sensor (not shown) are provided on the purge line 100. The first pressure sensor 400 and the second pressure sensor 500 detect pressures at front and rear ends of the purge pump 200 and continuously transmit the detected pressures to the control unit 900. The flow meter sensor is located between the purge valve 300 and the intake pipe I. The flow meter sensor continuously detects an amount of the vaporized gas flowing from the purge line 100 to the intake pipe I and transmits the detected amount to the control unit 900.

The control unit 900 collects the signals received from the fuel supply system, the lambda sensor S1, the first pressure sensor 400, the second pressure sensor 500, and the flow meter sensor and controls the RPMs of the purge pump 200 and an opening degree of the purge valve 300 so as to maintain the vaporized gas flowing from the purge line 100 to the intake pipe I at a target purge flow rate. The fuel supply system transmits a vehicle speed and a current amount of fuel injection to the control unit 900.

The target purge flow rate is a value derived in advance such that, in consideration of engine conditions (revolution per minute (RPM)), a temperature of cooling water, and the like), the vehicle speed, and an operating state of the fuel supply system, a mixing ratio of fuel and intake air which are supplied to the combustion chamber finally becomes a theoretical air-fuel ratio.

According to one example, the control unit 900 operates the purge pump 200 at one or more predetermined operating RPMs to allow a flow rate of the vaporized gas to become the target purge flow rate and operates the purge valve 300 according to the one or more predetermined operating RPMs of the purge pump 200 to become one or more predetermined opening degrees. The operating RPM of the purge pump 200 may be controlled at four steps of 15000, 30000, 45000, and 60000, and the opening degrees of the purge valve 300 may be controlled at 100%, 70%, 50%, and 30% steps.

The control unit 900 controls the operations of the purge pump 200 and the purge valve 300 on the basis of pieces of information detected by various sensors to adjust the amount of the vaporized gas flowing from the purge line 100 to the intake pipe I so that a concentration or a density of the vaporized gas supplied from the canister C to the intake pipe I may be adjusted.

Hereinafter, with reference to FIGS. 5 to 10 first, general control in which the APS of a hybrid vehicle according to one embodiment of the present disclosure processes a vaporized gas according to a vehicle speed and an engine condition will be described.

Figure 5:
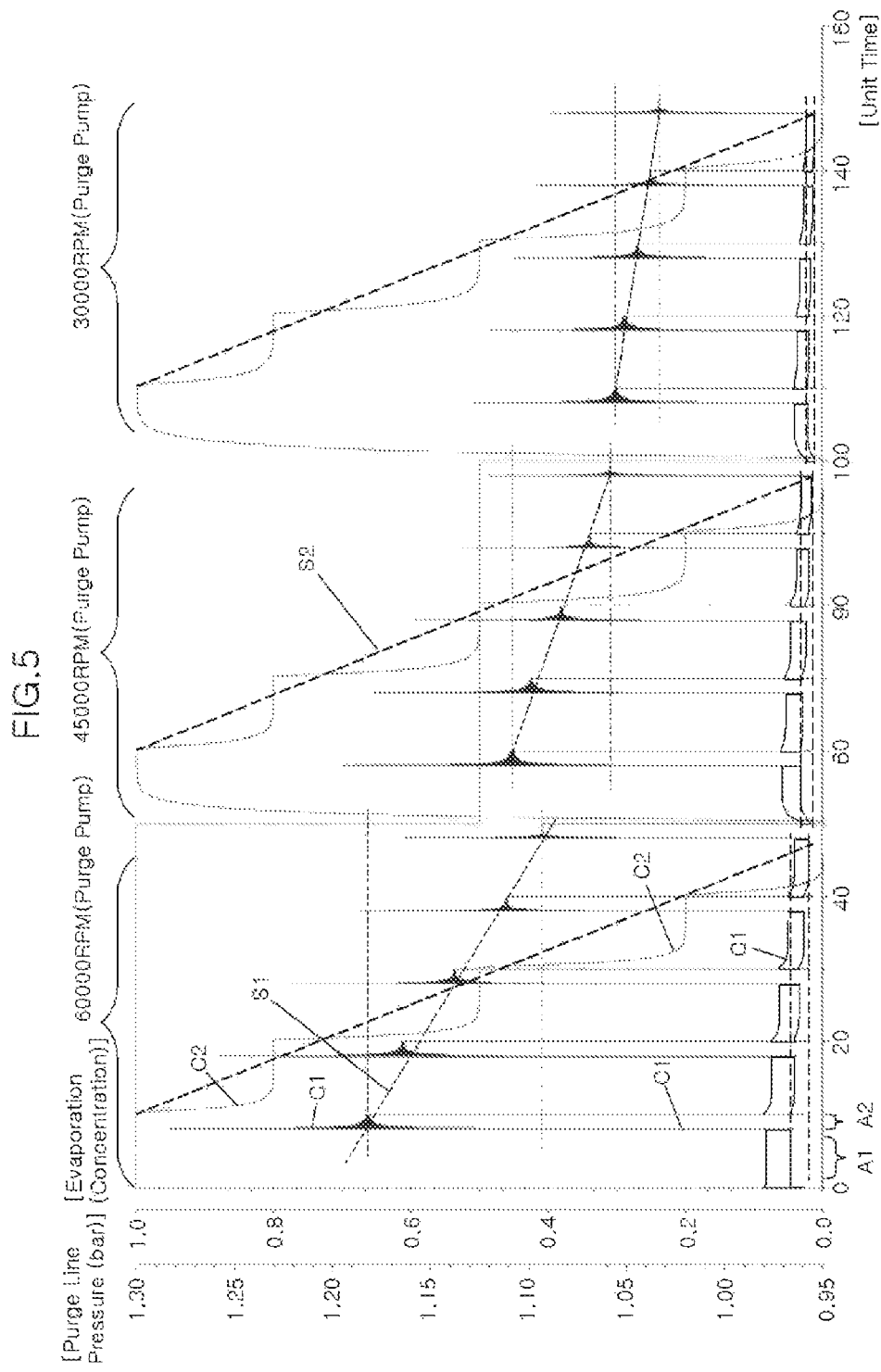
FIG. 5 is a graph showing a state of a purge line when a purge pump and a purge valve are operated.

FIG. 5 illustrates a graph showing that the RPM of the purge pump 200 is maintained at 60000, 45000, and 30000 for a unit time and then sequentially varied and, when a closing and an opening of the purge valve 300 are repeated multiple times at equal intervals, a pressure C1 and a vaporized gas concentration C2 between the purge pump 200 and the purge valve 300 of the purge line 100 are plotted.

While the purge pump 200 is maintained at 60000 RPM, 45000 RPM, and 30000 RPM, a pressure C1 remains in a relatively low state (section A1) when the purge valve 300 is opened and the pressure C1 remains in a relatively high state (section A2) when the purge valve 300 is closed. The vaporized gas concentration C2 is significantly decreased when the purge valve 300 is maintained in the open state and the vaporized gas concentration C2 is maintained in its original state when the purge valve 300 is closed.

It is estimated that, as an interval time in which the purge valve 300 is opened and closed decreases, both the pressure C1 and the vaporized gas concentration C2 are linearly decreased.

When the revolution of the purge pump 200 is maintained at a small number of RPM, a variation degree of the pressure C1 due to the repetition of the opening and closing of the purge valve 300 is small (see S1). Even when the revolution of the purge pump 200 is maintained at a different RPM, a variation degree of the vaporized gas concentration C2 due to the repetition of the opening and closing of the purge valve 300 is constant (see S2).

As a result, as the purge valve 300 is opened and closed while the purge pump 200 is maintained at the same RPM, variation trends of the pressure C1 and the vaporized gas concentration C2 may be calculated linearly.

Therefore, according to adjustment of the RPM of the purge pump 200 and a manipulation of the opening and closing of the purge valve 300, the vaporized gas having an appropriate concentration may be supplied to the intake pipe I at an appropriate pressure. The pressure of the vaporized gas supplied from the purge line 100 to the intake pipe I may be controlled to be higher than an internal pressure of the intake pipe I so that, even when the turbocharger T is operated, the vaporized gas may be injected into the intake pipe I.

Figure 6:
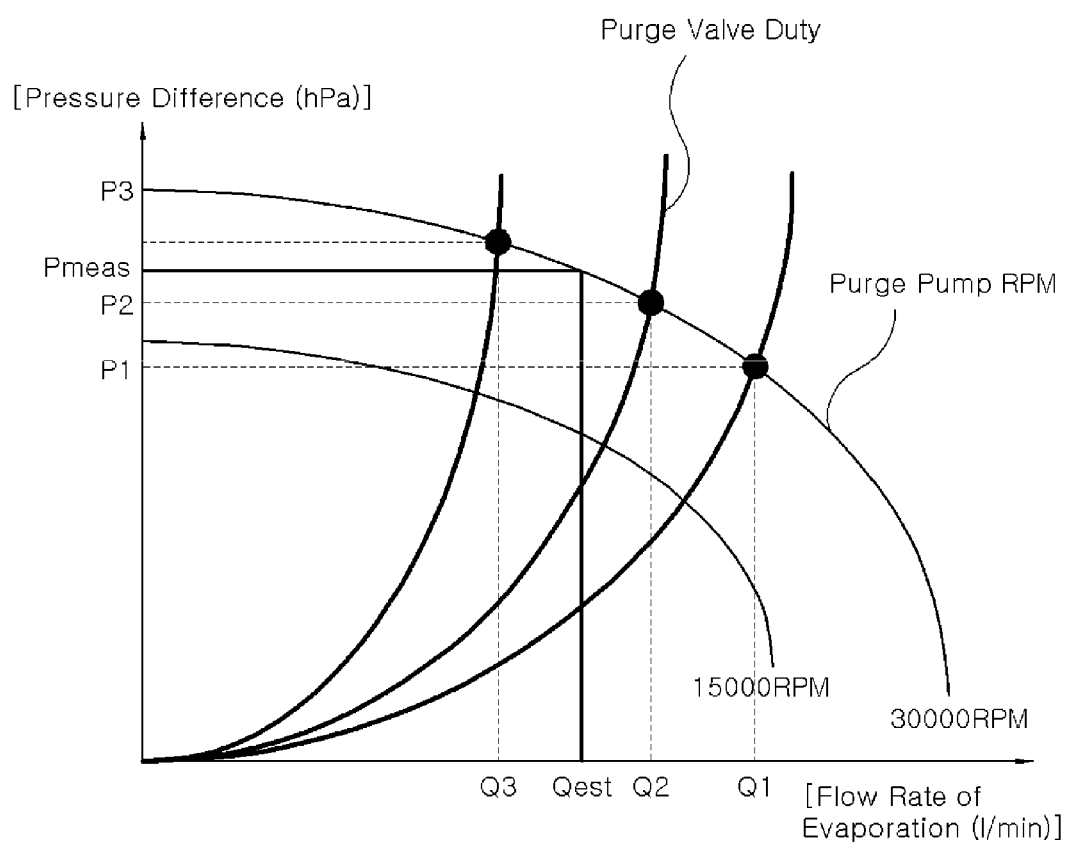
FIG. 6 is an exemplary graph for deriving a flow rate of a vaporized gas according to the operation of the purge pump.

FIG. 6 illustrates a characteristic graph of the purge pump 200. An X-axis indicates a flow rate, and a Y-axis indicates a pressure difference between front and rear ends of the purge pump 200. As shown in FIG. 6, when the RPM of the purge pump 200, the pressure difference between the front and rear ends of the purge pump 200, and the opening degree of the purge valve 300 are obtained, a flow rate of the vaporized gas introduced from the purge line 100 into the intake pipe I may be derived from a graph prepared in advance.

Figure 7:
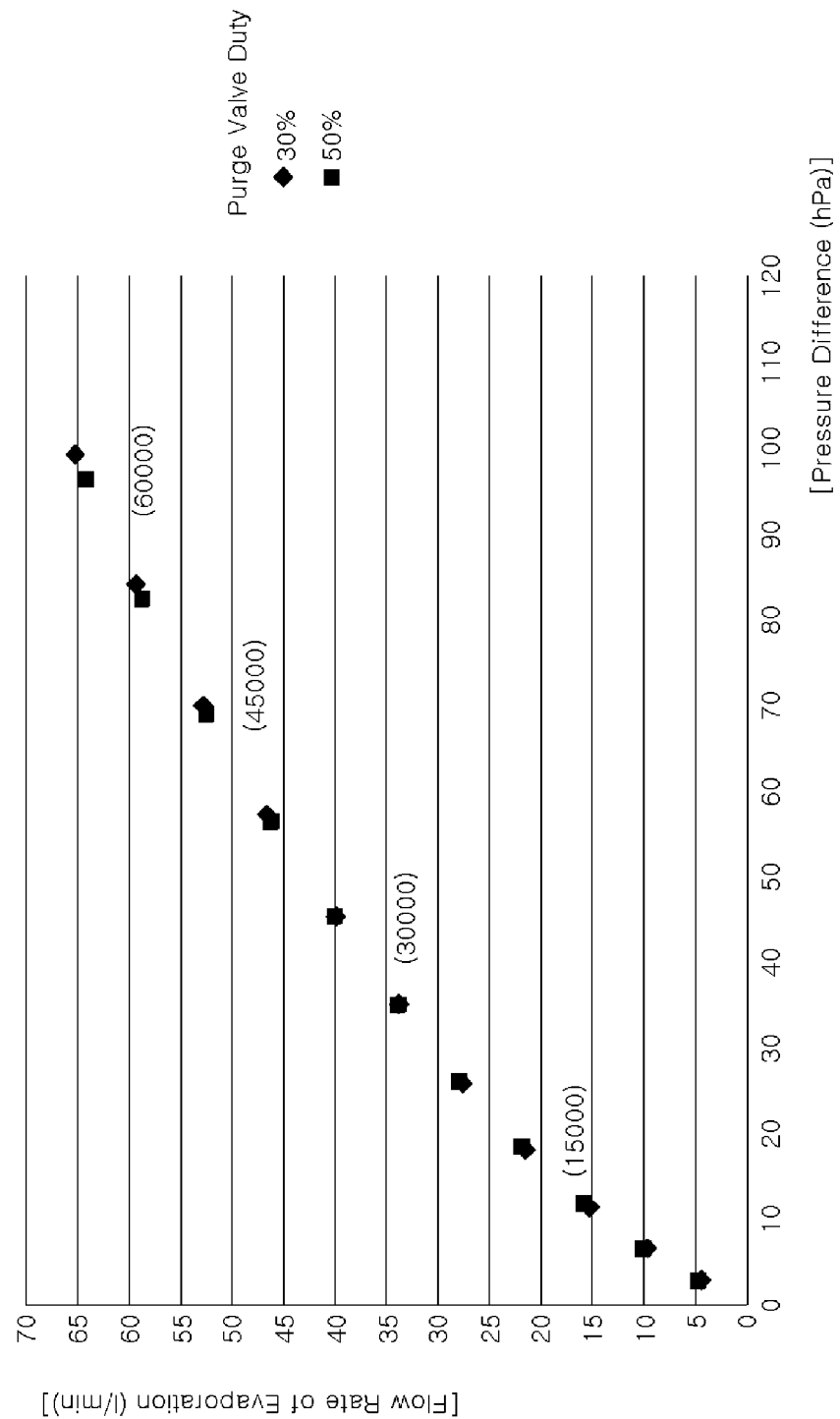
FIGS. 7 to 9 are graphs showing the flow rate of the vaporized gas according to the operation of the purge pump.
Figure 8:
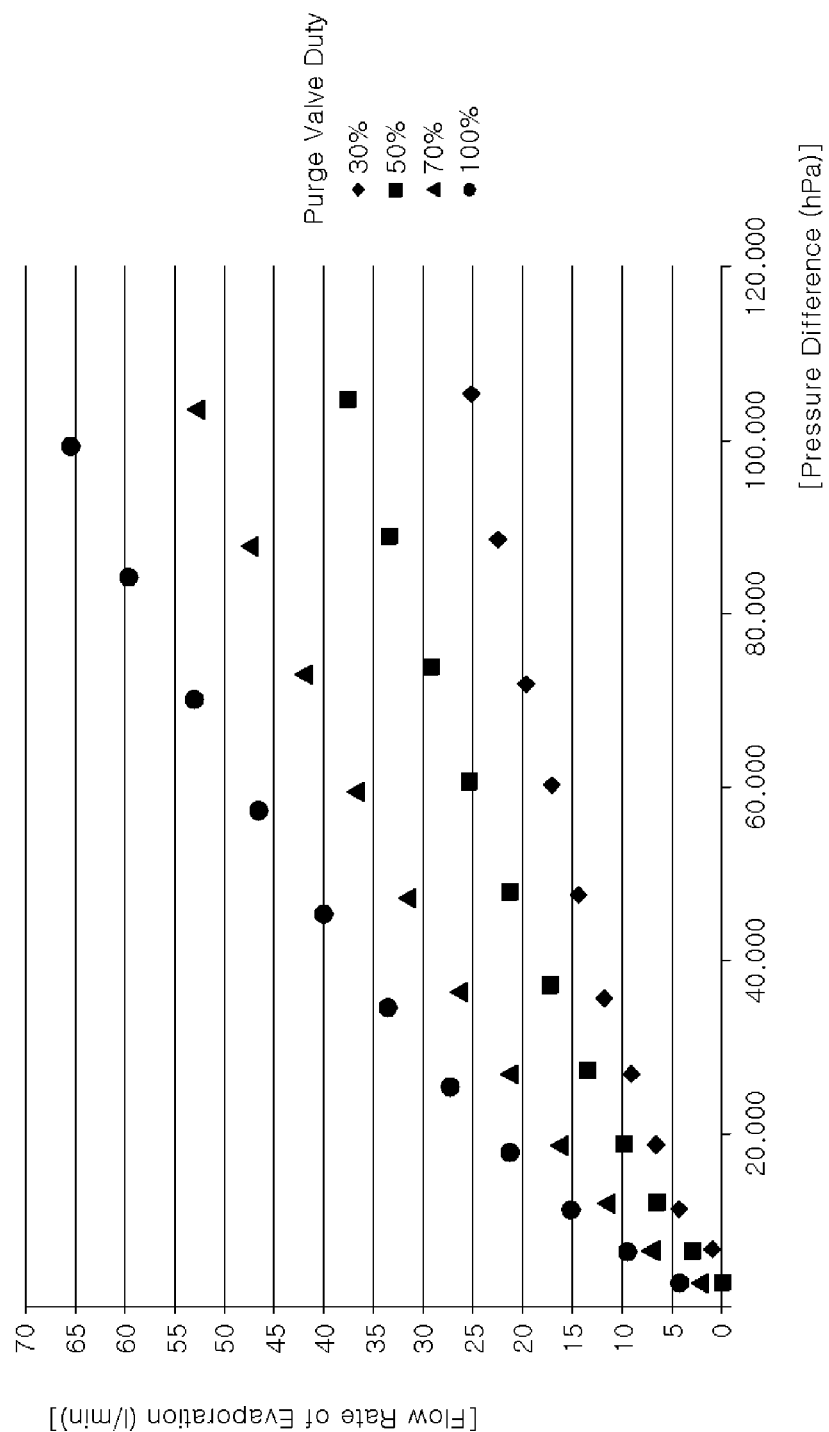
Figure 9:
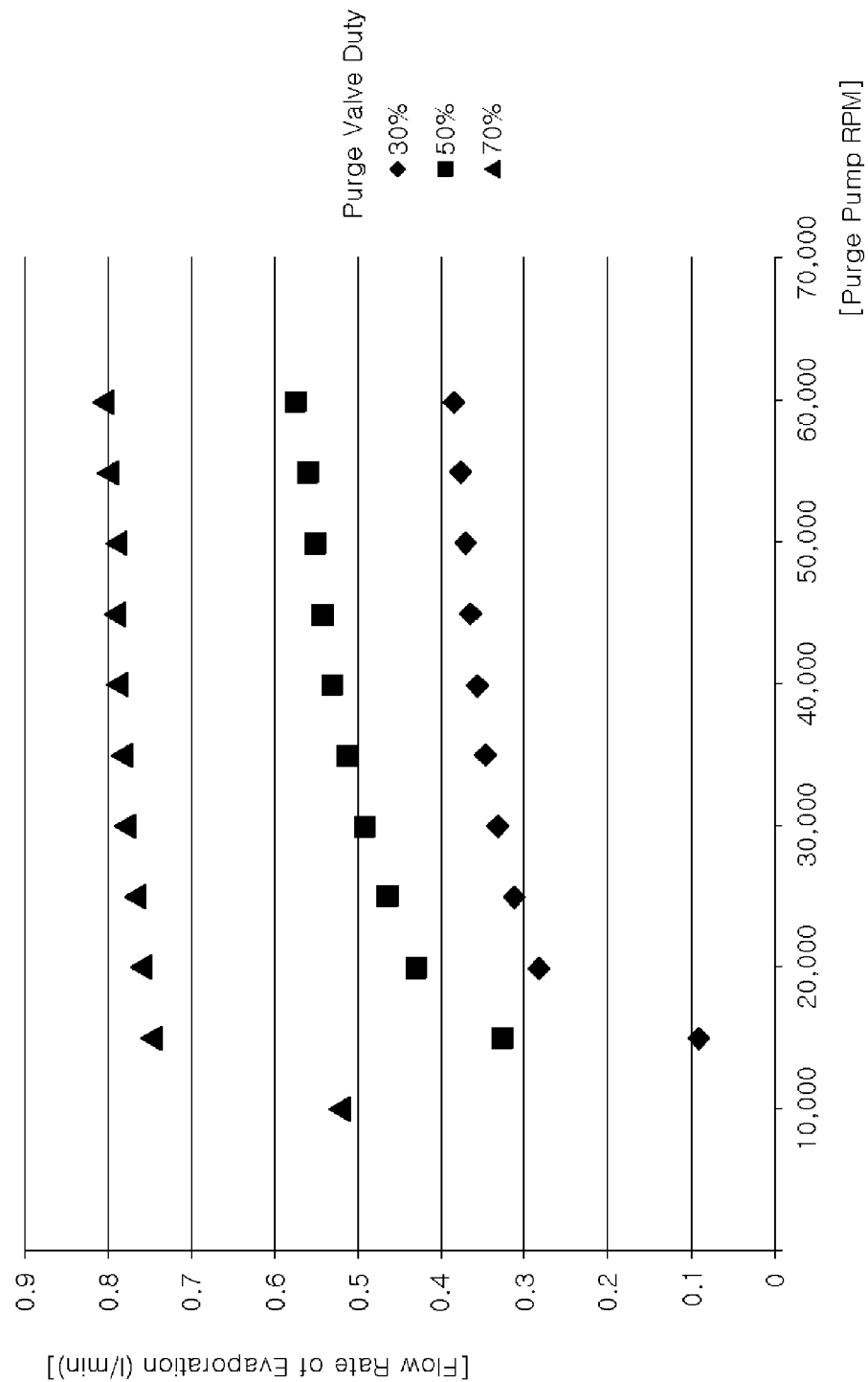

FIGS. 7 to 9 illustrate graphs showing the flow rate of the vaporized gas according to the operation of the purge pump 200. In FIG. 7, an X-axis indicates the pressure difference between the front and rear ends of the purge pump 200, and a Y-axis indicates the flow rate of the vaporized gas. As the RPM of the purge pump 200 is increased from 15000 to 60000 and the pressure difference between the front and rear ends of the purge pump 200 is increased, the flow rate of the vaporized gas is increased. Such an increase may be linear.

In FIG. 8, an X-axis indicates the pressure difference between the front and rear ends of the purge pump 200, and a Y-axis indicates the flow rate of the vaporized gas. The RPM of the purge pump 200 is kept constant, and the opening degree of the purge valve 300 is gradually varied from 30% to 100%. As the opening degree of the purge valve 300 is gradually increased from 30% to 100%, the flow rate of the vaporized gas is increased when compared to the pressure difference between the front and rear ends of the purge pump 200. Such an increase may be linear.

In FIG. 9, an X-axis indicates the RPM of the purge pump 200, and a Y-axis indicates a flow rate ratio. When compared to a case in which the opening degree of the purge valve 300 is 100%, when the RPM of the purge pump 200 is greater than or equal to an appropriate value, a constant flow rate ratio is maintained for each opening degree of the purge valve 300. Therefore, it can be seen that the flow rate of the vaporized gas may be adjusted through adjustment of the RPM of the purge pump 200 and the opening degree of the purge valve 300.

Figure 10:
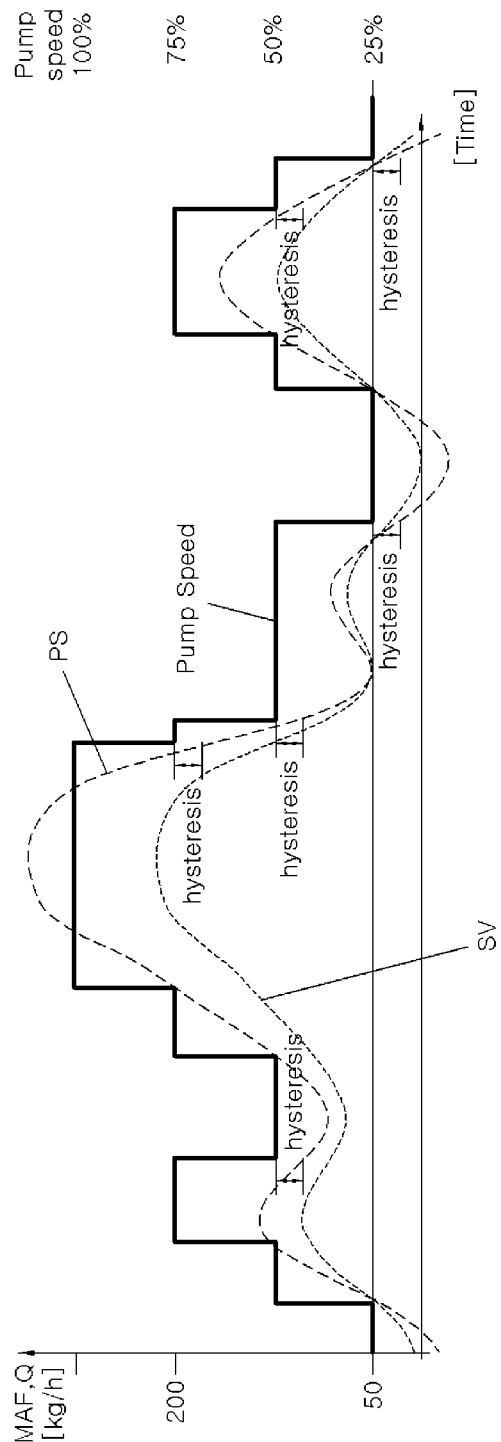
FIG. 10 is a graph showing a revolution per minute (RPM) of the purge pump, the flow rate of the vaporized gas, and an opening degree of the purge valve.

Referring to FIG. 10, during vehicle driving, when the RPM of the purge pump 200 is gradually appropriately controlled (PS) and an amount of the vaporized gas flowing in the purge line 100 is controlled by the purge valve 300 (SV), flow rates Q of the vaporized gas is varied non-linearly. In each case, the flow rates Q of the vaporized gas do not coincide with each other. This may be referred to as a kind of hysteresis.

As described above, through adjustment of the RPM of the purge pump 200, opening and closing timings of the purge valve 300, and the opening degree of the purge valve 300, the flow rate and the concentration of the vaporized gas supplied from the canister C to the intake pipe I may be adjusted and a density of the vaporized gas may also be estimated.

Meanwhile, as described above, when slip occurs in the power transmission system of the hybrid vehicle and when the vaporized gas is purged, the driving ability is degraded. In particular, as a number of places of the slip generated in the power transmission system is increased, a torque shortage problem due to the slip becomes more severe so that, at that point of time, degradation of the driving ability due to the purging of the vaporized gas becomes more severe.

Thus, in the APS according to the present disclosure, when it is determined that slip occurs in the power transmission system according to a driving state of the hybrid vehicle, the control unit 900 transmits a control duty to the purge pump 200 and the purge valve 300 so as to gradually control a purging amount of the vaporized gas according to the number of places at which the slip occurs.

For example, when it is determined that the slip occurs only between the HSG 15 and the engine 10 during a starting of engine 10, the control unit 900 transmits a control duty to the purge pump 200 and the purge valve 300 so as to control the purging amount in a predetermined control stage (a first stage). For example, in the above example described with reference to FIG. 10, the RPM of the purge pump 200 may be controlled to be a 45000 RPM, or the opening degree of the purge valve 300 may be controlled to be 70%.

Figure 12:
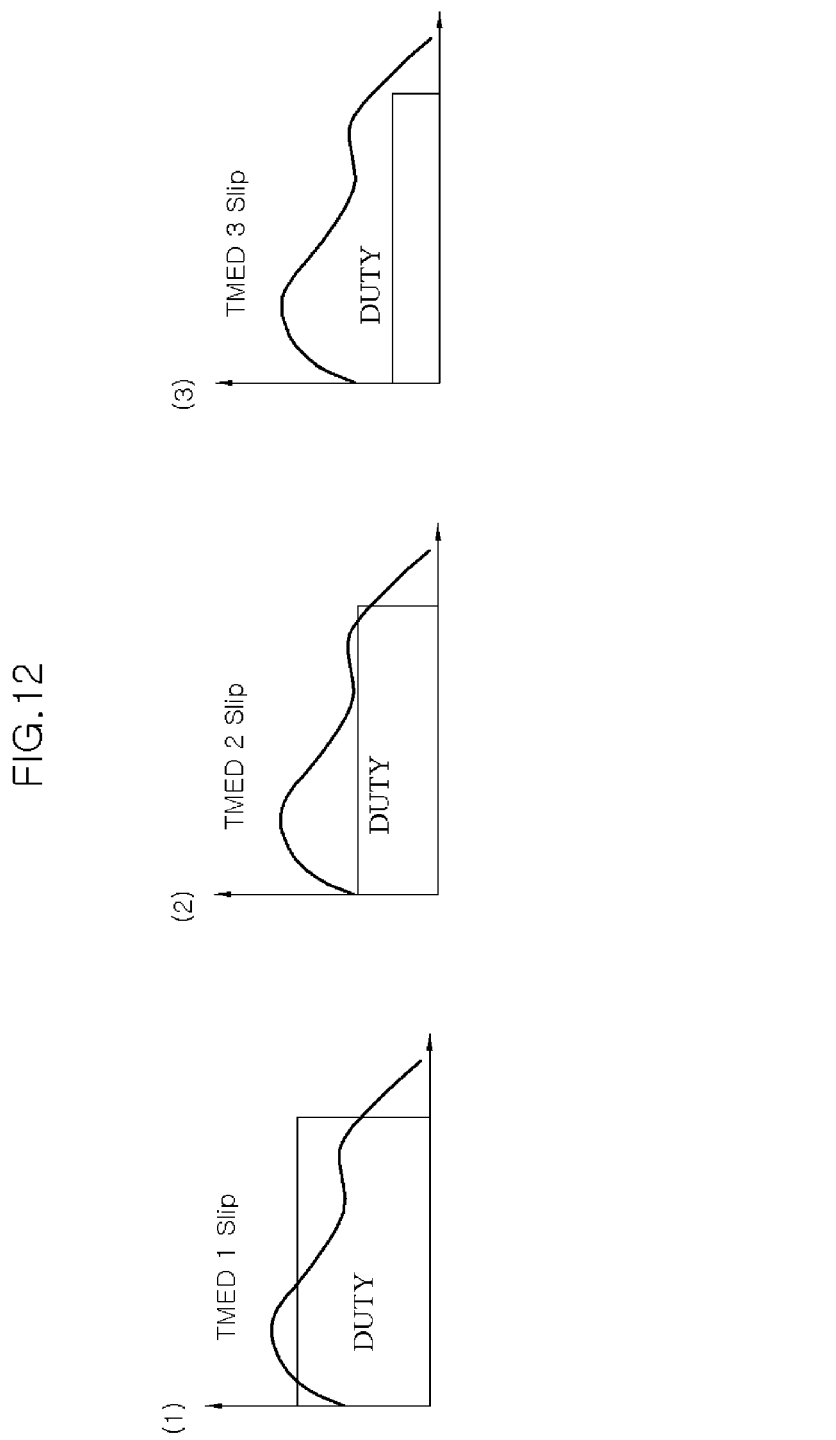
FIG. 12 is a graph showing duty control for each stage according to the number of slip occurrences.
Figure 13:
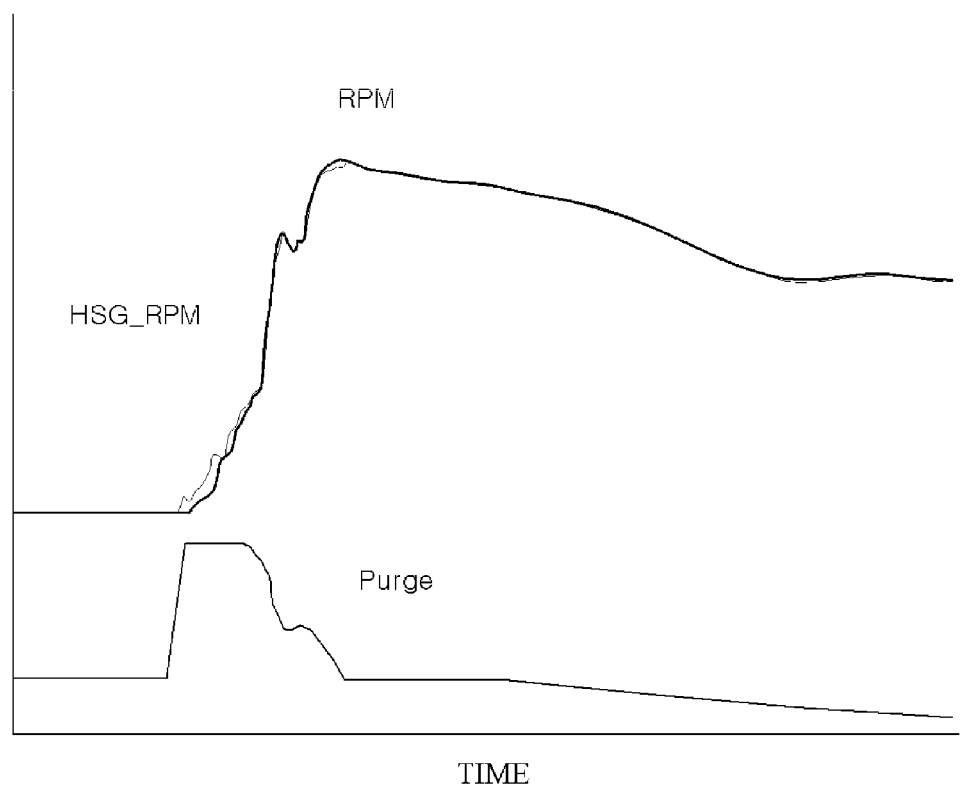
FIG. 13 is a graph showing a variation in RPM of each of an engine and a hybrid start and generator (HSG) and a variation in purging amount over time in a case to which the active gas purging method according to the present disclosure is applied.

Meanwhile, when it is determined that slip occurs in two places between the HSG 15 and the engine 10 and between the engine 10 and motor 30, as shown in FIG. 12, the control unit 900 transmits a control duty (a lower control duty) to the purge pump 200 and the purge valve 300 so as to control the purging amount in a second stage in which the purging amount is controlled to be lower than that in the first stage. For example, the control unit 900 may control the purge pump 200 so as to allow the RPM of the purge pump 200 to be a 30000 RPM that is lower than a 45000 RPM in the first stage or control the purge valve 300 so as to allow the opening degree of the purge valve 300 to be 50% that is lower than 70% in the first stage.

Meanwhile, when it is determined that slip occurs in three places between the HSG 15 and the engine 10, between the engine 10 and the motor 30, and between the motor 30 and the transmission 50, as shown in FIG. 12, the control unit 900 transmits a control duty (a lower control duty) to the purge pump 200 and the purge valve 300 so as to control the purging amount in a third stage in which the purging amount is controlled to be lower than that in the second stage. For example, the control unit 900 may control the purge pump 200 so as to allow the RPM of the purge pump 200 to be a 15000 RPM that is lower than the 30000 RPM in the second stage or control the purge valve 300 so as to allow the opening degree of the purge valve 300 to be 30% that is lower than 50% in the second stage.

As described above, the purging amount is gradually controlled according to the places at which the slip is generated so that it is possible to suppress further degradation of the driving ability due to an inflow of the vaporized gas.

Meanwhile, in the APS according to the present disclosure, the control unit 900 may perform control for correcting a target purging amount according to charging and discharging of the high voltage battery on the basis of the driving state of the hybrid vehicle.

For example, during charging of the high voltage battery, a large amount of fuel should be supplied to the engine 10 so as to secure a sufficient torque, and thus the target purging amount is adjusted so as to be allow the purging amount to be increased when compared to the target purging amount during the above-described general control. To this end, with respect to the target purging amount during the general control, a value multiplied by one or more correction coefficients having a predetermined magnitude is set as a target purging amount, or a value obtained by adding a predetermined coefficient is set as a target purging amount so that the correction control may be performed.

In contrast, during discharging of the high voltage battery, in order to improve the driving ability and reduce a noise, when compared to the target purging amount in the above-described general control, a target purging amount is adjusted so as to allow the purging amount to be reduced. To this end, with respect to the target purging amount during the general control, a value multiplied by one or more correction coefficients having a predetermined magnitude that is less than one is set as a target purging amount, or a value obtained by subtracting a predetermined coefficient is set as a target purging amount so that the correction control may be performed.

Consequently, it is possible to purge an appropriate amount of the vaporized gas in consideration of the driving ability during charging and discharging, a noise, and a driving torque.

Figure 11:
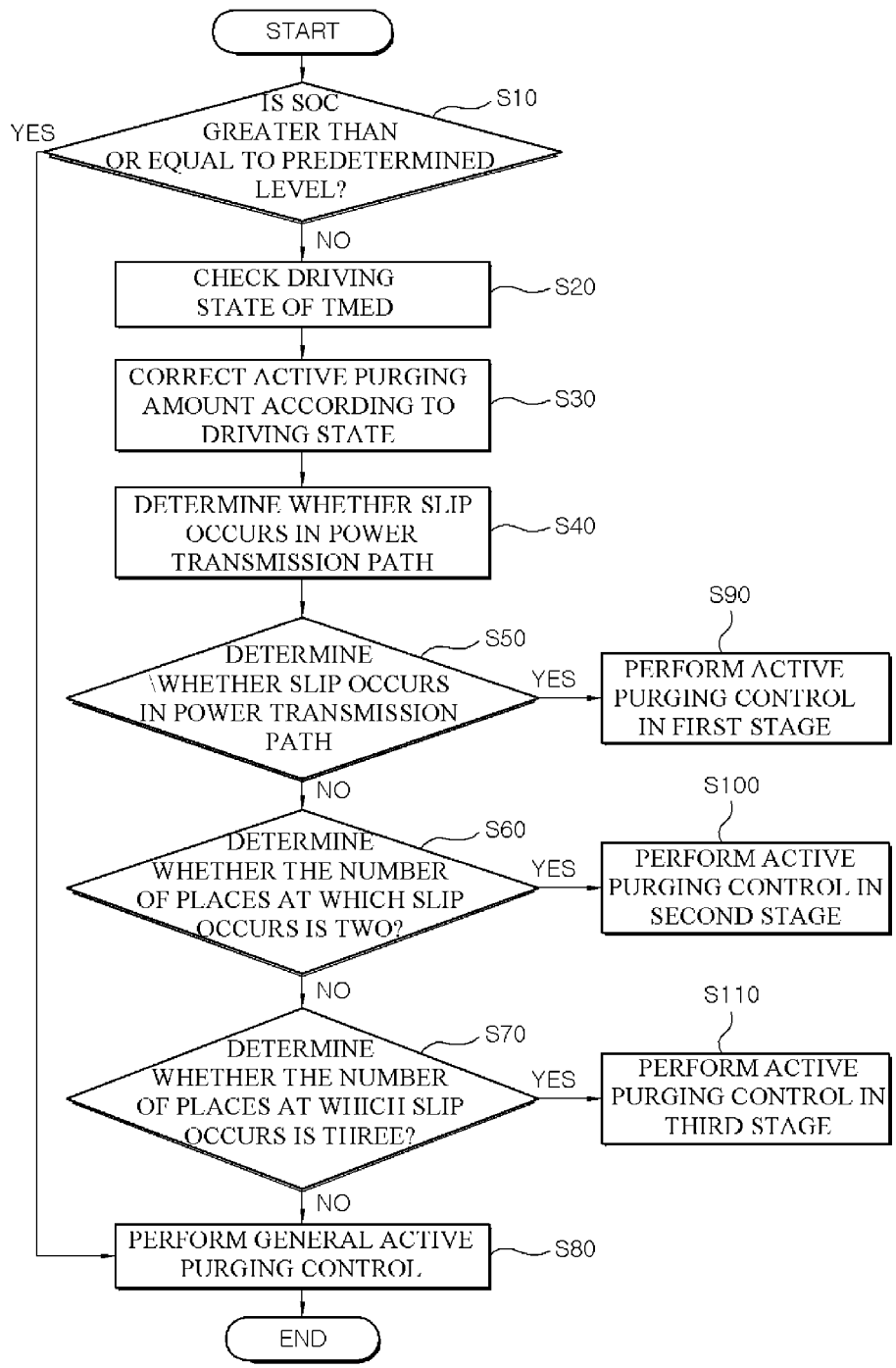
FIG. 11 is a flowchart illustrating an active purging method of a hybrid vehicle according to one embodiment of the present disclosure.

Hereinafter, an active purging method performed in the control unit 900 of the hybrid vehicle according to one embodiment of the present disclosure will be described in detail with reference to FIG. 11.

First, the control unit 900 determines whether an SOC of a battery of the hybrid vehicle is greater than or equal to a predetermined level (S10). Here, the SOC may be calculated by measuring a voltage (OCV), a current, and a temperature of the battery using a sensor installed in the vehicle and using the measured values.

When the SOC is greater than or equal to the predetermined level, since a sufficient torque may be secured from the motor 30 using electric power charged in the battery, a problem of degradation in driving ability according to a reduction of a torque due to slip is not significant. Thus, when it is determined that the SOC is greater than or equal to the predetermined level in S10, general active purging control for controlling a purging amount according to a vehicle speed and an engine state is performed (S80).

Meanwhile, when the SOC is less than the predetermined level, since the SOC of the battery is insufficient, there is a limit in supplementing the torque amount using the motor 30. Thus, in this case, control responding to degradation of driving ability according to a decrease in torque due to slip, which will be described below, is performed.

First, the control unit 900 checks a driving state of a parallel hybrid vehicle (transmission mounted electric device (TMED)) (S20). That is, it is determined whether a current driving state of the vehicle is in a state in which an engine is driven or the engine and a motor are driven while charging a high voltage battery or whether the engine is driven or the engine and the motor are driven while discharging the high voltage battery.

Then, control is performed to correct a purging amount according to the determination result (S30). For example, as described above, during charging of the high voltage battery, a large amount of fuel should be supplied to the engine so as to secure a sufficient torque, and thus the target purging amount is adjusted so as to be allow the purging amount to be increased when compared to the target purging amount during the above-described general control. In contrast, during discharging of the high voltage battery, in order to improve the driving ability and reduce a noise, when compared to the target purging amount in the above-described general control, a target purging amount is adjusted so as to allow the purging amount to be reduced.

Next, the control unit 900 determines whether slip occurs in a power transmission path of the hybrid vehicle (S40). Whether the slip occurs may be determined by detecting a difference between rotation speeds of two rotating bodies using a sensor and comparing the difference with a predetermined value. For example, whether slip occurs between the engine 10 and the motor 30 may be determined such that a rotation speed of the engine 10 and a rotation speed of the engine clutch 20 connecting the engine 10 and the motor 30 are detected by a sensor and, when a difference between the rotation speeds is greater than a predetermined value, it may be determined that the slip occurs. Meanwhile, in the power transmission system of the hybrid vehicle, power generated by the HSG 15 is transmitted to the engine 10 first, and then the power is transmitted to the motor 30 and the transmission 50. Thus, preferably, it is determined whether the slip occurs between the HSG 15 and the engine 10 first, and then it is sequentially determined whether slip occurs between the engine 10 and the motor 30 and between the motor 30 and the transmission 50.

Next, the purging amount is gradually controlled according to the determination result in S40. First, as described above, when it is determined that the number of places at which the slip occurs is one (YES of S50), the purging amount is controlled in the first stage which is a predetermined control stage (S90). For example, when it is determined that the slip occurs only between the HSG 15 and the engine 10, an RPM of the purge pump 200 may be controlled to be a 45000 RPM, or an opening degree of the purge valve 300 may be controlled to be 70%.

Meanwhile, as described above, when it is determined that the number of places at which the slip occurs are two (YES of S60), the purging amount is controlled in the second stage of reducing the purging amount when compared with the first stage (S100). For example, when it is determined that the slip occurs at the two places between the HSG 15 and the engine 10 and between the engine 10 and the motor 30, the RPM of the purge pump 200 is controlled to become a 30000 RPM that is lower than a 45000 RPM in the first stage, or the opening degree of the purge valve 300 is controlled to become an opening degree of 50% that is lower than the opening degree of 70% in the first stage so that the purging amount is gradually reduced.

Meanwhile, as described above, when it is determined that the number of places at which the slip occurs are three (YES of S70), the purging amount is controlled in the third stage of further reducing the purging amount when compared with the second stage (S110). For example, when it is determined that the slip occurs at all the three places between the HSG 15 and the engine 10, between the engine 10 and the motor 30, and between the motor 30 and the transmission 50, the RPM of the purge pump 200 is controlled to become a 15000 RPM that is lower than the 30000 RPM in the second stage, or the opening degree of the purge valve 300 is controlled to become an opening degree of 30% that is lower than the opening degree of 50% in the second stage so that the purging amount is gradually further reduced.

Meanwhile, as the determination result in S40, when it is determined that the slip does not occur in the power transmission path of the hybrid vehicle, general active purging control for controlling a purging amount by adjusting the RPM of the purge pump and the opening degree of the purge valve according to a vehicle speed and an engine condition is performed.

As described above, according to the APS of a hybrid vehicle and the active purging method thereof according to one embodiment of the present disclosure, the purging amount is controlled to be gradually decreased according to the number of places at which the slip occurs so that, when the slip occurs, it is possible to suppress degradation of the driving ability due to purging of the vaporized gas.

In addition, during the charging and discharging of the hybrid vehicle, the purging amount of the vaporized gas is differently corrected according to the charging or discharging so that the degradation of the driving ability may be prevented, and a sufficient amount of the vaporized gas may be effectively purged.

Meanwhile, the controller 60 and the control unit 900, which are described above, may be implemented in the form of a computer provided in a vehicle. In this case, a program for implementing a control function may be recorded on a computer-readable recording medium, and the program recorded on the computer-readable recording medium may be read into a computer system and executed. In addition, the "computer system" as used herein is a computer system built into the vehicle and includes an operating system (OS) and hardware such as peripheral devices. In addition, the "computer-readable recording medium" refers to a storage device including as portable media such as a flexible disk, an optical magnetic disk, a read only memory (ROM), and a compact disc (CD)-ROM, and a hard disk built in the computer system. In addition, the "computer-readable recording medium" may include a device for dynamically maintaining a program for a short period of time, such as a communication line when the program is transmitted through a network such as the Internet or a communication line such as a telephone line and may include a device for maintaining the program for a certain period of time, such as a volatile memory in the computer system which is a server or a client during the transmission of the program. In addition, the program may be a program for implementing a part of the above-described function or may be a program which implements the above-described function by combining a program already recorded in the computer system.

In accordance with an active purge system (APS) of a hybrid vehicle and an active purging method thereof according to one embodiment of the present disclosure, the purging amount is controlled to be gradually decreased according to the number of places at which the slip occurs so that, when the slip occurs, it is possible to suppress degradation of the driving ability due to purging of the vaporized gas.

In addition, during the charging and discharging of the hybrid vehicle, the purging amount of the vaporized gas is differently corrected according to the charging or discharging so that the degradation of the driving ability can be prevented, and a sufficient amount of the vaporized gas can be effectively purged.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. An active purge system (APS) of a hybrid vehicle according to a driving state of the hybrid vehicle, the APS comprising:

an active purge unit (APU) configured to pressurize a vaporized gas generated in a fuel tank of the hybrid vehicle and supply the pressurized vaporized gas to an intake pipe; and
a control unit configured to control the APU,
wherein the control unit gradually controls a processing amount of the vaporized gas according to the driving state of the hybrid vehicle,
wherein the APU includes:
  a purge line which connects a canister configured to adsorb the vaporized gas to the intake pipe;
  a purge pump mounted on the purge line; and
  a purge valve mounted on the purge line and located between the purge pump and the intake pipe,
  wherein the control unit adjusts a revolution per minute (RPM) of the purge pump and an opening degree of the purge valve in a plurality of stages so as to allow the vaporized gas flowing from the purge line to the intake pipe to be maintained at a target purge flow rate, and
  wherein the control unit adjusts the RPM of the urge pump and the opening degree of the purge valve in the plurality of stages according to a number of places at which slip occurs in a power transmission path of the hybrid vehicle.

2. The APS of claim 1, wherein the control unit generates a control duty for controlling the RPM of the purge pump and the opening degree of the purge valve in a first stage when the slip occurs at one place on the power transmission path of the hybrid vehicle, generates a control duty for controlling the RPM of the purge pump and the opening degree of the purge valve in a second stage in which a duty amount is lower than a duty amount in the first stage when the slip occurs at two places on the power transmission path of the hybrid vehicle, and generates a control duty for controlling the RPM of the purge pump and the opening degree of the purge valve in a third stage in which a duty amount is lower than the duty amount in the second stage when the slip occurs at three places on the power transmission path of the hybrid vehicle.

3. The APS of claim 1, wherein the control unit adjusts the RPM of the purge pump and the opening degree of the purge valve according to a vehicle speed and an engine condition when it is determined that the slip does not occur in the power transmission path of the hybrid vehicle.

4. The APS of claim 1, wherein the slip occurs at one or more places between a hybrid start and generator (HSG) and an engine, between the engine and a motor, and between the motor and a transmission.

5. The APS of claim 1, wherein the control unit differently corrects and controls a target RPM of the purge pump and a target opening degree of the purge valve according to charging or discharging of the hybrid vehicle.

6. An active purging method of a hybrid vehicle using an active purge unit (APU) provided with a canister configured to adsorb a vaporized gas, a purge line which connects the canister to an intake pipe, a purge pump mounted on the purge line, and a purge valve mounted on the purge line and located between the purge pump and the intake pipe, the active purging method comprising:
  determining, by a control unit, whether slip occurs in each power transmission path of the hybrid vehicle; and
  adjusting, by the control unit, a revolution per minute (RPM) of the purge pump and an opening degree of the purge valve in a plurality of stages according to a number of places at which slip occurs in the power transmission path of the hybrid vehicle.

7. The active purging method of claim 6, wherein adjusting the opening degree of the purge valve in the plurality of stages includes controlling the RPM of the purge pump and the opening degree of the purge valve in a stage in which a purging amount is decreased among the plurality of stages as the number of places at which slip occurs in the power transmission path of the hybrid vehicle is increased.

8. The active purging method of claim 7, further comprising:
  controlling the RPM of the purge pump and the opening degree of the purge valve in a first stage when the slip occurs at one place on the power transmission path of the hybrid vehicle;
  controlling the RPM of the purge pump and the opening degree of the purge valve in a second stage in which a duty amount is lower than a duty amount in the first stage when the slip occurs at two places on the power transmission path of the hybrid vehicle; and
  controlling the RPM of the purge pump and the opening degree of the purge valve in a third stage in which a duty amount is lower than a duty amount in the second stage when the slip occurs at third places on the power transmission path of the hybrid vehicle.

9. The active purging method of claim 6, further comprising:
  determining whether a state of charge (SOC) of a high voltage battery is greater than or equal to a predetermined level,
  wherein, when the SOC of the high voltage battery is greater than or equal to the predetermined level, general control is performed to adjust the RPM of the purge pump and the opening degree of the purge valve according to a vehicle speed and an engine conditions, and
  when the SOC of the high voltage battery is less than the predetermined level, the control for adjusting the RPM of the purge pump and the opening degree of the purge valve in the plurality of stages is performed according to the number of places at which slip occurs in the power transmission path of the hybrid vehicle.

10. The active purging method of claim 6, wherein, when it is determined that the slip does not occur in the power transmission path of the hybrid vehicle, general control for adjusting the RPM of the purge pump and the opening degree of the purge valve according to a vehicle speed and an engine condition is performed.

11. The active purging method of claim 6, further comprising:
  determining a driving state of the hybrid vehicle and a charging/discharging state of the high voltage battery;
  differently correcting a target RPM of the purge pump and a target opening degree of the purge valve according to charging or discharging of the hybrid vehicle; and
  performing control on the basis of the corrected target RPM of the purge pump and the corrected target opening degree of the purge valve.

* * * * *